UNITED STATES PATENT OFFICE.

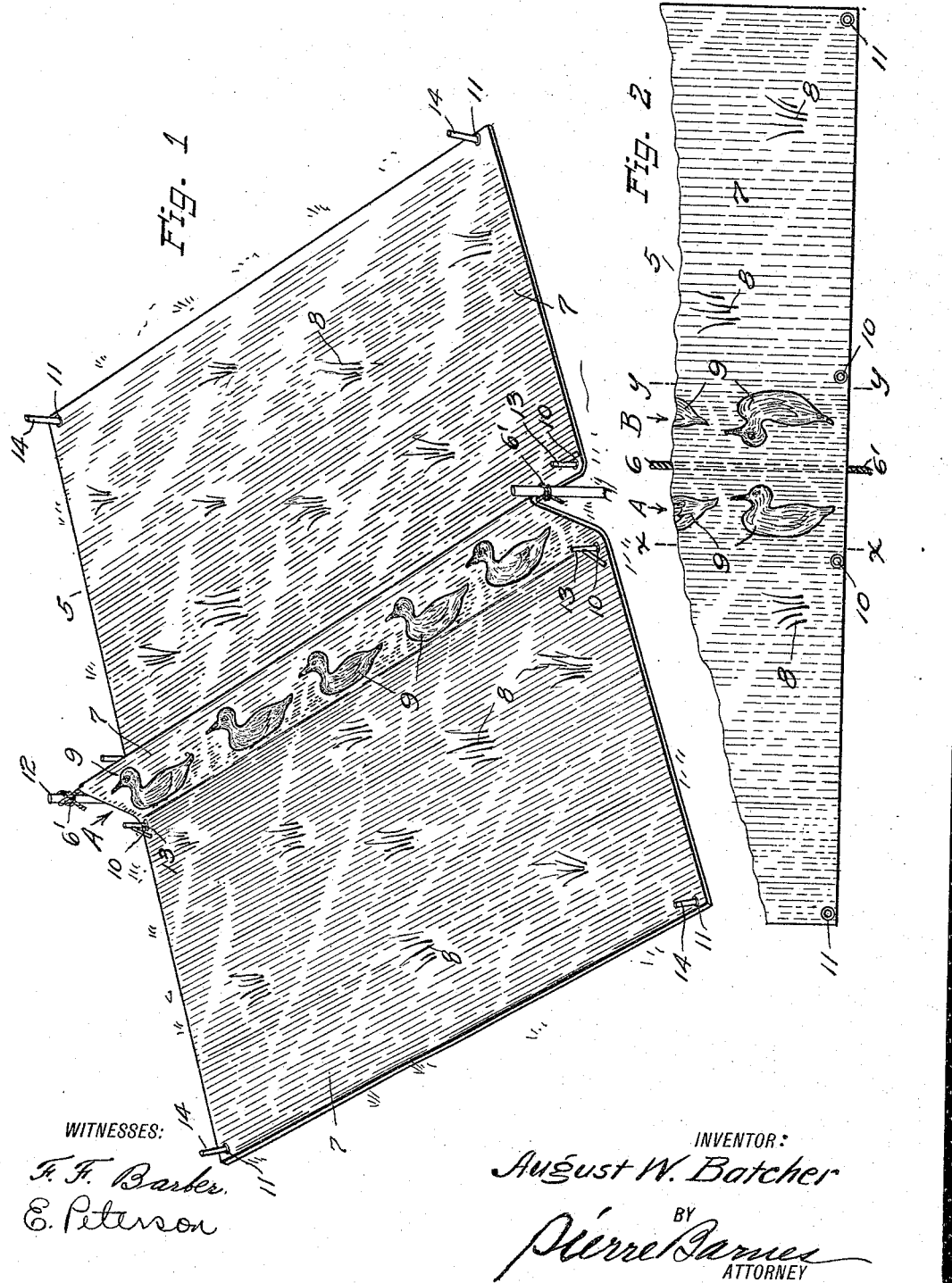

AUGUST W. BATCHER, OF HOQUIAM, WASHINGTON.

DECOY.

1,185,164. Specification of Letters Patent. Patented May 30, 1916.

Application filed April 28, 1915. Serial No. 24,402.

*To all whom it may concern:*

Be it known that I, AUGUST W. BATCHER, a citizen of the United States, residing at Hoquiam, in the county of Chehalis and State of Washington, have invented certain new and useful Improvements in Decoys, of which the following is a specification.

This invention relates to decoys; and its object is the provision of effective and conveniently employed devices whereby water fowl may be induced to approach within shooting distance of a sportsman.

With these ends in view, the invention consists of a sheet of canvas or other suitable material upon which is painted or otherwise displayed a representation of a body of water and a number of birds shown pictorially.

The invention further consists in the novel application or adaptation of devices which will be hereinafter described and claimed.

In the accompanying drawings, Figure 1 is a perspective view of an embodiment of my invention and shown as applied. Fig. 2 is a plan view of a portion of the sheet illustrated in Fig. 1 but shown in distended condition.

In carrying out my invention, I provide a sheet 5 of canvas or other suitable material which may be of any suitable shape and size as, for example, twenty yards wide by thirty yards long. Medially of the length of said sheet there is sewed or otherwise secured to the underside of the same a rope 6 having ends $6^1$ which protrude beyond the sides of the sheet. The upper surface of said sheet is painted or has printed thereon in proximity to the rope a picture representing in suitable color and shade effects a body of water, as indicated by 7, and in which is desirably shown clumps 8 of tule, weeds, etc. Also shown in this picture are two transverse rows A and B of water fowls 9 represented as floating or swimming in the illusionary water. These rows of birds are disposed at opposite sides of and in proximity to the rope, as indicated in Fig. 2. Adjacent to each of its corners the sheet is provided with a hole 11 and also holes 10 in proximity to the sides of the sheet and to lines, denoted by $x$ and $y$, produced through the apparent floatative lines of the respective rows of birds.

To use the device, the rope ends $6^1$ are secured to posts 12 at a distance above the ground so that the spaces in which the birds are shown at each side of the rope may be exposed in inclined planes, as illustrated in Fig. 1. Pegs 13 are then driven through the holes 10 and the ends of the sheet are spread upon the ground and held down by pegs 14 inserted through the holes 11. By such arrangement of the sheet are provided a tent-shaped central portion having the decoy birds exposed in approximately upright positions while the representation of water extends over the horizontal portions and as a backing or waterscape for the decoys on the upwardly protruding portion.

In practice the device has proved very satisfactory as an attraction for birds and should be located in proximity to the feeding places of birds or within view of their usual courses when in flight.

Bands of ducks upon observing the device will approach close to the device before becoming aware of the deception, whereupon they circle above the same before departing to give in the interim an opportunity to shoot from an ambush such as a shock of grain or hollow stump.

What I claim as my invention, is—

1. A decoy comprising a substantially rectangular sheet of flexible material pictorially represented to simulate water and further having extending across the same pictorial representation of water fowl disposed in two spaced rows, a rope secured to the under side of the sheet on a line between the two pictorially represented rows of water fowl with its ends extending beyond the marginal edges of the sheet to provide tying means, the sheet being also provided adjacent its marginal edges with openings to receive securing stakes passed through said openings.

2. A device of the class described, comprising a substantially rectangular sheet of flexible material having thereupon a pictorial representation of a body of water and two transversely arranged parallel rows of water-fowls represented as floating in the water intermediate the length of the sheet, combined with means for holding the sheet elevated on a line between the two rows of water fowls represented to present one row of such representations at each side of the elevated portion of the sheet.

3. A device of the class described, comprising a substantially rectangular sheet of flexible material having thereupon a pictorial representation of a body of water and two transversely arranged rows of water-fowls represented as floating in the water substantially mid-way the length of the sheet, and means whereby the portion of the sheet bearing the representation of rows of water-fowls may be elevated to cause said water-fowls to appear in approximately upright positions, one row at each side of the elevated portion of the sheet.

4. In a device of the class described, a rectangular sheet of flexible material, a transversely arranged rope secured to said sheet intermediate its length and having its ends extending beyond the edges of the sheet, said sheet having a row of pictorially represented birds disposed on the sheet at each side of the rope, said sheet further having a representation of water covering the surface of the sheet which is unoccupied by the bird representation, the projecting ends of said rope being adapted to be secured to supports for retaining the adjacent portions of the sheet at a higher elevation than the more remote portions.

Signed at Seattle, Washington, this 9th day of April, 1915.

AUGUST W. BATCHER.

Witness:
E. PETERSON.

Copies of this patent may be obtained for five cents each, by addressing the "Commissioner of Patents, Washington, D. C."